United States Patent

Shumaker

[11] Patent Number: 5,924,382
[45] Date of Patent: Jul. 20, 1999

[54] MULTIPLE HUMMINGBIRD FEEDER

[76] Inventor: Louis Shumaker, 9800 Old Quarter Rd., New Kent, Va. 23124

[21] Appl. No.: 09/017,670

[22] Filed: Feb. 3, 1998

Related U.S. Application Data

[51] Int. Cl.⁶ .................................................. A01K 7/04
[52] U.S. Cl. ............................................... 119/72; 119/78
[58] Field of Search .................... 119/51.5, 69.5, 119/72, 74, 78, 80, 72.5, 75, 77, 79

[56] References Cited

U.S. PATENT DOCUMENTS

| | | |
|---|---|---|
| D. 172,301 | 5/1954 | Peterson ...................................... D12/2 |
| 1,518,018 | 12/1924 | Thompson . |
| 1,816,684 | 7/1931 | Liechty . |
| 1,928,103 | 9/1933 | Hill . |
| 2,292,020 | 8/1942 | Venolia ...................................... 119/78 |
| 2,502,720 | 4/1950 | Haley ......................................... 119/74 |
| 2,509,455 | 5/1950 | Rysdon . |
| 2,618,237 | 11/1952 | McDermott et al. . |
| 2,703,099 | 3/1955 | Smallegan ................................. 137/428 |
| 2,706,966 | 4/1955 | Cline . |
| 3,525,315 | 8/1970 | Lange ......................................... 119/71 |
| 3,714,929 | 2/1973 | Boterweg . |
| 4,347,687 | 9/1982 | Sibbel . |
| 4,829,933 | 5/1989 | Van der Veer . |
| 5,025,754 | 6/1991 | Plyler . |
| 5,062,390 | 11/1991 | Bescherer et al. ......................... 119/72 |
| 5,184,570 | 2/1993 | Hostetler . |
| 5,247,904 | 9/1993 | Anderson ................................... 119/72 |
| 5,269,259 | 12/1993 | Keeler ........................................ 119/72 |
| 5,507,249 | 4/1996 | Shaw . |

*Primary Examiner*—Jack W. Lavinder
*Assistant Examiner*—Yvonne R. Abbott
*Attorney, Agent, or Firm*—Millen, White, Zelano & Branigan, P.C.

[57] ABSTRACT

A multiple hummingbird feeder includes a source of liquid suitable for feeding hummingbirds and a feeding station having at least one outlet adapted to dispense liquid to hummingbirds. A reservoir is connected to both the source of liquid and the feeding station. There is a valve in the reservoir for opening to the source of liquid when the level of liquid in the reservoir is below a preselected level.

20 Claims, 2 Drawing Sheets

MULTIPLE HUMMINGBIRD FEEDER

BACKGROUND OF THE INVENTION

This invention relates generally to hummingbird feeders and, in particular, to a feeder that may be adapted to feed multiple hummingbirds.

It is common for people who live in an area inhabited by hummingbirds to encourage their presence by the use of hummingbird feeders. These feeders are distinct from the conventional feeder in that, rather than the usual dry food consumed by most birds, the hummingbird feeds on simulated nectar. The nectar is formed from water sweetened with sugar or honey. The nectar is normally stored in a reservoir and conveyed to simulated flowers where a perch is provided so that the hummingbird can land and, having a long, slender beak, insert it into the access apertures in the simulated flower and feed.

There are basically two common designs of hummingbird feeders. One type consists of an inverted bottle that empties into a lower reservoir with feeding holes. The vacuum created at the top of the bottle is what keeps the liquid from draining out. The simplest form of this type of feeder is a small inverted bottle with a rubber stopper and a glass tube coming out the bottom. The other common type of feeder is simply a container with holes in its cover through which the hummingbirds reach to get their fluid. Many of these are thin disks with representations of flowers on the upper surface.

There are substantial limitations to these common types of hummingbird feeders. The "vacuum" type feeders require the entire feeder be dismantled and taken down from its position in order to refill. Also, these vacuum feeders are known to corrode or be inefficient, thereby allowing leakage of the hummingbird food. The other common type of hummingbird feeder which is merely a reservoir with holes in its cover, is constantly in need of refilling, because the level of hummingbird food is constantly being reduced by the feeding hummingbirds. This type of hummingbird feeder also must be taken down and taken apart to be refilled. These conventional types of hummingbird feeders are also limited in the number of hummingbirds they can feed. In other words, the number of feeding stations cannot be varied and the number is typically limited.

SUMMARY OF THE INVENTION

It is an object of the present invention to provide a solution to the foregoing drawbacks and to provide a convenient and easy-to-use multiple hummingbird feeder. This and other objects will be clear to one of skill in the art upon reading this specification and the appended claims.

The invention includes a hummingbird feeder having a source of liquid suitable for feeding hummingbirds, and a feeding station having at least one outlet adapted to dispense the liquid to hummingbirds. A reservoir is connected both to the source of liquid and to the feeding station. There is a valve in the reservoir for opening to the source of liquid when the level liquid in the reservoir is below a preselected level. The valve which opens the supply tank to the reservoir may be connected to a float in the reservoir so that when the float drops below the preselected level in the reservoir, the valve opens and when the float raises to a preselected level, the valve closes.

The invention also includes a hummingbird feeder having a supply tank, a reservoir and a feeding station. The supply tank is mounted above the reservoir to hold a volume of liquid food for hummingbirds and includes a first connector to the reservoir. The reservoir includes a float valve that is attached to the first connector. The reservoir also includes a second connector that is attached to the feeding station. The feeding station includes a chamber to hold the liquid food and a port on top of the chamber whereby hummingbirds have access to the liquid food inside the feeding station.

DETAILED DESCRIPTION OF A PREFERRED EMBODIMENT

The drawings display a hummingbird feeder made up generally of three major components—a supply tank, a reservoir, and a feeding station. The invention may be made of three separate unitary pieces, or the invention may be integrally combined into two pieces or even one piece. Those of skill in the art and those having a need of a specific application may design variations of the assembly that incorporate the teachings herein and that are encompassed by the appended claims.

Figure 1:
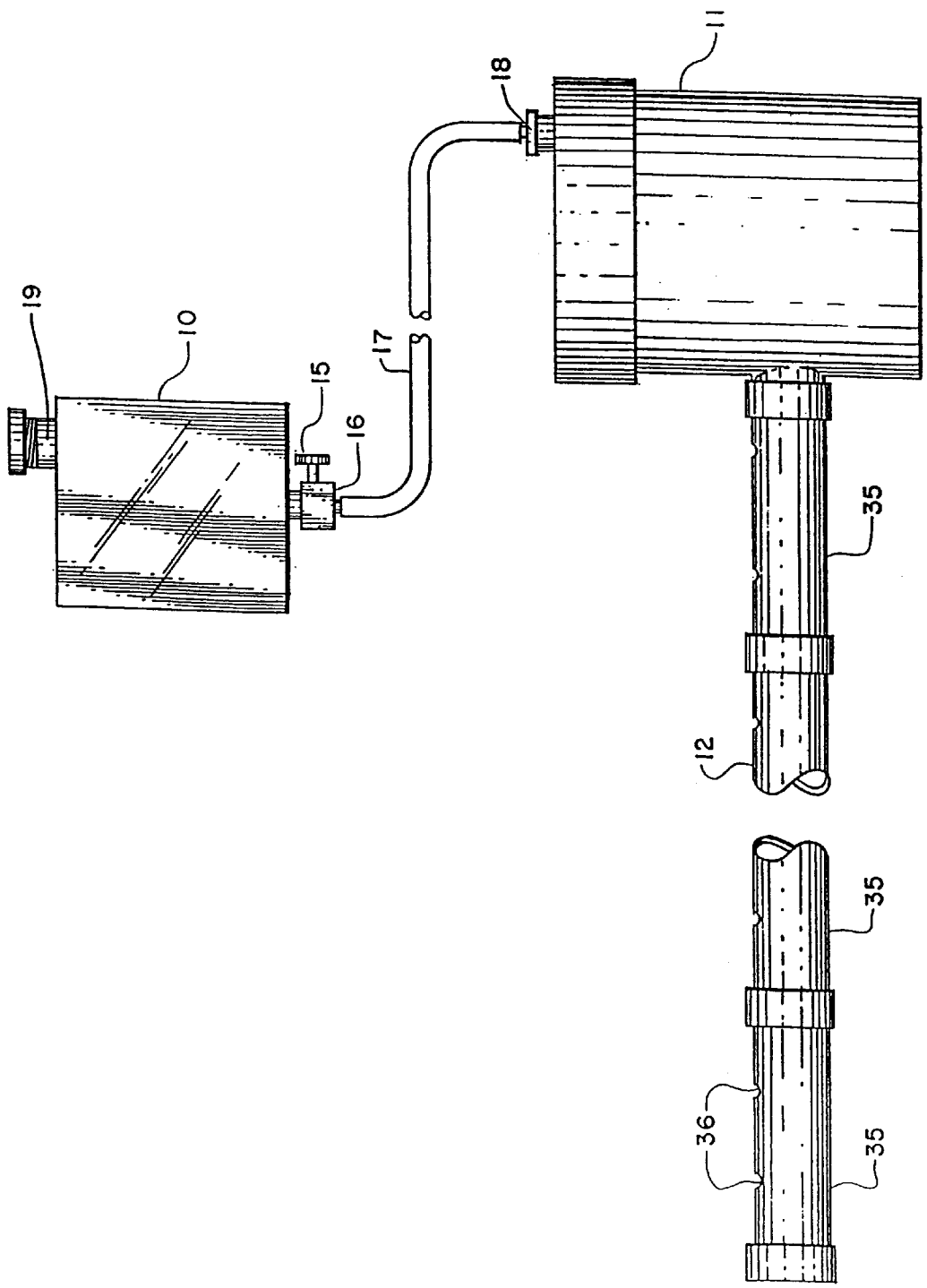
FIG. 1 is a perspective view of a preferred embodiment of the hummingbird feeder assembly.

The source of liquid suitable for feeding hummingbirds is shown in FIG. 1 as a unitary food supply tank 10. The specific composition of liquid hummingbird food that is carried in the food supply tank 10 will vary depending on commercially available mixes or packages that are used to make up a batch of food. In general, hummingbird food is primarily a high sugar content liquid that may contain other ingredients. At the bottom of the food supply tank 10 is a valve 15 that may be opened or closed to allow the liquid to pass through a first connector 18 and into the reservoir 11 or not. A coupling 16 is placed below the valve 15 so that the valve may be turned off and the supply tank 10 decoupled for refilling without having to worry about spillage and without having to worry about dismantling the entire feeder. A tube 17 is shown connecting the supply tank 10 to the reservoir 11; however, any other type of passage may be used to connect the food supply tank to the reservoir. Alternatively, as discussed earlier, a supply tank may be integral with a reservoir. In either case, however, it is advantageous to have a valve and a coupling mechanism that would allow the supply tank to be detached and refilled without having to move or dismantle the reservoir. The supply tank 10 also comprises an access port 19 that may be used to gain access to the tank so the tank may also be refilled in place. The food supply tank 10 may be made of plastic or metal. Preferably, the tank 10 would be able to hold one or more gallons of liquid food so that it does not need to be refilled too often. Also, different brackets may be used to mount the tank 10 on a wall, fence, tree or any other location for the feeder.

Figure 2:
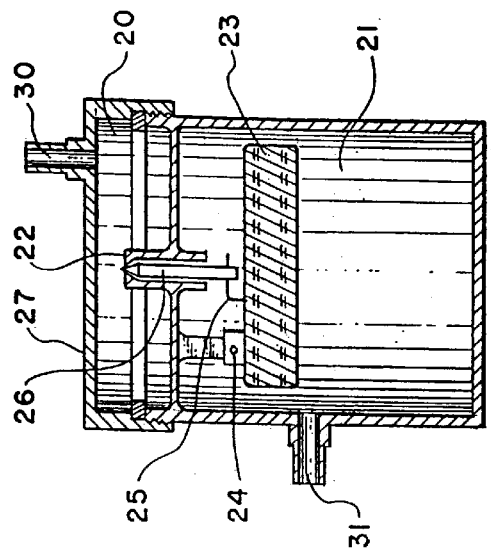
FIG. 2 is a side, elevation, sectional view of one embodiment of a reservoir in which the valve is in the closed position.
Figure 3:
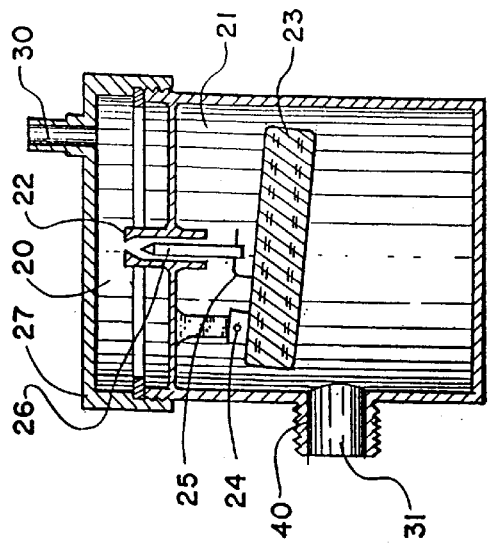
FIG. 3 is a side, elevation, sectional view of another embodiment of a reservoir in which the valve is in the open position.

As shown in FIGS. 2 and 3, the reservoir 11 is comprised of two chambers 20 and 21. If the reservoir 11 were integral with the food supply tank 10, the reservoir might be a single chamber. Alternatively, the tube 17 from the food supply tank 10 may be attached directly to the needle valve 22. As shown, however, liquid is allowed to flow through the first connector or inlet 30 and into the upper chamber 20 of the reservoir 11 where it may then pass through the needle valve 22 into the lower chamber 21 of the reservoir. The needle valve 22 is actuated by a float 23 such that when the float is at a predetermined level, the needle valve is in a closed position as shown in FIG. 2. Similarly, when the float 23 drops to a lower level when the liquid in the lower chamber 21 drops, then the needle valve 22 will open and allow the flow of liquid from the upper chamber to the lower chamber of the reservoir 11. (See FIG. 3). The needle valve 22 is comprised of the float 23, a hinge 24 connecting the float to a wall of the reservoir, a bracket 25 attached to the top of the float, and a needle 26 attached to the end of the bracket in such a manner that the needle will move up and down with the up and down movement of the float. It will be understood by those with skill in the art that the needle valve described herein is one type of a float valve and may be replaced by other types of float valve mechanisms or other types of valves generally. The purpose of the valve is to regulate the flow of liquid into the reservoir, thereby making the liquid available for the feeding station.

An inlet 30 allows for the flow of the liquid from the food supply tank 10 into the upper chamber 20 of the reservoir 11. The second connector or outlet 31 allows for the flow of the liquid food from the lower chamber 21 into the feeding station 12 that is mounted off of the side of the reservoir 11. The reservoir 11 is mounted in parallel position to the feeding station 12 so that the fluid in the lower chamber 21 of the reservoir may flow freely from the reservoir into the feeding station. The entire feeder apparatus is mounted so that the reservoir 11 is fixed below the supply tank 10 as shown to enable the fluid to be fed into the reservoir by gravity. Similarly, the parallel mounted relationship between the reservoir 11 and the feeding station 12 allows the fluid to flow freely from the reservoir to the feeding station.

The assembly is designed so that the float 23 will close the valve 22 when the fluid in the lower chamber 21 of the reservoir 11 reaches a predetermined level. When the fluid falls below that predetermined level, the needle valve 22 opens up and allows liquid to flow from the upper chamber 20 into the lower chamber 21 of the reservoir 11. The shape of the reservoir 11 may be anything that one of skill in the art could imagine. Functionally, there must be at least one chamber than can hold fluid and allow movement of a float or any other type of actuator to regulate a valve and open it and close it so that the predetermined level of liquid may be maintained. The outlet 31 may be situated anywhere on the reservoir 11 below the float 23. The float 23 is mounted so that it is parallel to a predetermined level of liquid food within the feeding station.

Figure 4:
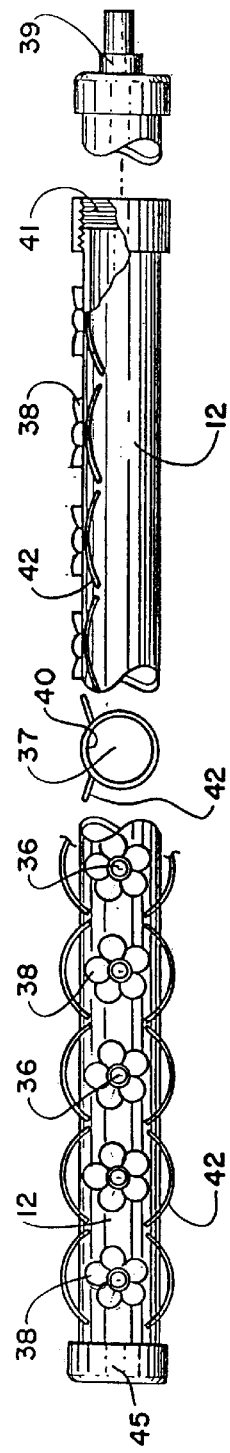
FIG. 4 displays an exploded side elevation view with a partial cutaway, including a cross section, of a feeding station.

The feeding station 12 is shown as a long tube in FIGS. 1 and 4, with a cavity 37 in its hollow middle. Obviously, the feeding station 12 may take any desired shape. The feeding station 12 is hollow to allow the flow of liquid into the feeding station. The length of the feeding station 12 is variable. Different segments 35 of tube may be added as the number of hummingbirds using the feeder increases or decreases. The segments 35 may be attached with threaded ends 41 or by any type of conventional adherence. A cap 45 is placed at the end of the pipe 12 to contain the food inside the cavity 37 in the pipe. Specifically, in a preferred embodiment, the tube is a section of one-half inch inside diameter PVC pipe. The pipe 12 has holes 36, also referred to as outlets or ports, drilled in its top, and each segment of pipe has at least one hole to act as a feeding station, to allow a hummingbird to have access to the food in the cavity 37 within the pipe. It has been observed that forming the holes 36 four inches apart gives the hummingbirds enough room to feed without blocking access to neighboring holes. In order to assist the birds with their feeding, perches 42 have been added to each side of a hole 36 to give the hummingbirds a place to stand while they are feeding through the holes in the top of the tube. Other artificial ornamentation 38 such as a plastic flower may be used to give the impression of a flower with nectar, thereby enticing a hummingbird to use the feeder. The inlet 39 to the feeding station 12 is attached to the outlet that extends from the lower chamber 21 of the reservoir 11. In one embodiment, FIGS. 1 and 3, the inlet 31 is integral with the lower chamber 21 such that the inlet 39 to the feeding station 12 and the outlet 31 from the reservoir are the same component. In a preferred embodiment, the float is parallel with the top of the inside diameter 40 of the tube so that liquid food will always be at or near the top of the tube 12 for feeding. In this way, the food is easily accessible through the holes 36 in the top of the tube 12.

The entire feeder is preferably designed to be accessible for ordinary cleaning and maintenance. The top 27 of the reservoir 11 is threaded so that it may be removed and all the components in the feeder may be periodically cleaned. Similarly, the cap 45 is threaded so that it may be removed and the feeding station 12 cleaned.

While the invention has been described with particular reference to specific embodiments, in the interest of complete definiteness, it will be understood that it may be embodied in a variety of forms diverse from those specifically shown and described, without departing from the spirit and scope of the invention as defined by the appended claims. It is intended that all such embodiments shall fall within the scope of protection provided by the claims attached hereto.

That which is claimed is:

1. A hummingbird feeder comprising
a supply tank, a reservoir and a feeding station,
the supply tank being mounted above the reservoir to hold a volume of liquid food for hummingbirds and comprising a first connector to the reservoir,
the reservoir comprising a float valve that is attached to the first connector and further comprising a second connector that is attached to the feeding station, and
the feeding station comprising a cavity to hold the liquid food and further comprising a port on top of the cavity whereby hummingbirds have access to the liquid food inside the feeding station, wherein the reservoir and the feeding station are mounted in parallel position so that the liquid food may flow freely from the reservoir into the feeding station.

2. The hummingbird feeder described in claim 1 wherein the first connector comprises a detachable coupling whereby the supply tank can be detached, refilled and reattached to the feeder without moving the feeding station.

3. The hummingbird feeder described in claim 1 wherein the supply tank and the reservoir are unitary.

4. The hummingbird feeder described in claim 1 wherein the feeding station is further comprised of a hollow tube.

5. The hummingbird feeder described in claim 4 wherein the hollow tube defines a plurality of ports whereby a plurality of hummingbirds may feed at the same time.

6. The hummingbird feeder described in claim 5 wherein the hollow tube is comprised of a plurality of segments wherein each segment defines at least one port whereby the number of ports may be varied by varying the number of segments.

7. The hummingbird feeder described in claim 1 wherein a perch is provided proximate the port whereby a hummingbird will have a location on which to rest while feeding.

8. The hummingbird feeder described in claim 1 wherein the feeding station is further comprised of a plurality of ports.

9. The hummingbird feeder described in claim 8 wherein a perch is provided proximate every port.

10. A hummingbird feeder comprising:

a source of liquid suitable for feeding hummingbirds;

a feeding station having at least one outlet adapted to dispense the liquid to hummingbirds;

a reservoir connected both to the source of liquid and to the feeding station; and a valve in the reservoir for opening to the source of liquid when the level of liquid in the reservoir is below a preselected level, wherein the reservoir and the feeding station are mounted in parallel position so that the liquid may flow freely from the reservoir into the feeding station.

11. The hummingbird feeder of claim 10, wherein the source of liquid is a supply tank.

12. The hummingbird feeder of claim 11, wherein the supply tank is separate from the reservoir and connected thereto by a coupling, whereby the supply tank may be detached from the reservoir.

13. The hummingbird feeder of claim 11, wherein the supply tank is integral with the reservoir.

14. The hummingbird feeder of claim 11, wherein the valve which opens the supply tank to the reservoir is connected to a float in the reservoir and wherein, when the float drops below the preselected level in the reservoir, the valve opens, and when the float rises to a preselected level, the valve closes.

15. The hummingbird feeder in claim 14, wherein the supply tank is adapted to be mounted above the reservoir so that reservoir is filled by gravity when the valve is open.

16. The hummingbird feeder of claim 15, wherein the feeding station has a plurality of outlets allowing for simultaneous feeding of hummingbirds.

17. The hummingbird feeder of claim 11, wherein the feeding station has a plurality of outlets allowing for simultaneous feeding of hummingbirds.

18. The hummingbird feeder of claim 10, wherein the feeding station has a plurality of outlets allowing for simultaneous feeding of hummingbirds.

19. The hummingbird feeder of claim 10, wherein the feeding station is a hollow tube having a plurality of outlets.

20. The hummingbird feeder of claim 19, wherein each outlet has a perch.

* * * * *